June 27, 1972  M. J. RHYDDERCH  3,672,870

SPRAY REFINING

Original Filed May 22, 1967  2 Sheets-Sheet 1

Inventor

M.J. RHYDDERCH

By Holcombe, Wetherill & Brisebois
Attorneys

United States Patent Office 3,672,870
Patented June 27, 1972

---

3,672,870
SPRAY REFINING
Malvern John Rhydderch, Firbeck, near Worksop, England, assignor to The British Iron and Steel Research Association
Original application May 22, 1967, Ser. No. 640,122, now Patent No. 3,554,521. Divided and this application Mar. 27, 1970, Ser. No. 29,724
Claims priority, application Great Britain, May 23, 1966, 22,790/66
Int. Cl. C21c 5/00
U.S. Cl. 75—52                                    4 Claims

ABSTRACT OF THE DISCLOSURE

A method and apparatus for refining iron in which a stream of molten iron is shattered by oxidising gas in a vessel from which gas is withdrawn to induce air into the vessel.

---

This application is a division of our prior application Ser. No. 640,122, now U.S. Pat. No. 3,554,521.

This invention is concerned with improvements in and relating to the refining of carbon-containing metal by oxidising impurity therein.

In our United Kingdom (Pats. Nos. 890,282, 949,610 and 1,006,082, there is described a process for reducing impurity in ferrous metal by oxidising such impurity, the process comprising establishing a stream of molten metal and shattering the stream into droplets by a jet of oxidising gas. This process is referred to as spray refining.

It is an object of this invention to provide an improved spray refining process and apparatus for carrying out that process.

According to the present invention there is provided a process for refining molten carbon-containing metal comprising feeding the metal to a reaction vessel as a freely falling flow therein, shattering the freely falling flow in space within the vessel by streams of oxidising gas, collecting the refined molten particulate metal in the vessel and extracting gas from the vessel to thereby induce air into the vessel to burn the carbon monoxide produced by the primary oxidation.

Preferably slag forming material is fed to the vessel as a flow adjacent the metal, the two flows being together shattered and intimately mixed by the gas streams. In the particular case of refining crude iron to reduce the carbon content, the oxidizing gas is preferably oxygen or oxygen enriched air. The high temperature produced by the oxidation of the carbon as the gas breaks up the flows renders the slag forming material molten and immediate intimate contact is obtained of the refined metal droplets and molten slag forming material.

According to the present invention there is further provided apparatus for carrying out the process according to the invention, the apparatus comprising a container having an outlet from which molten metal may be fed as a freely falling flow, a reaction vessel comprising an upper cover portion through which the flow may pass and a lower receiving portion, gas discharge means to produce gas streams convergent upon the path of the metal flow whereby that flow may be shattered in the vessel, extractor means coupled to the vessel to remove gas therefrom and passage means communicating between the interior of the vessel and atmosphere through which in operation air will be drawn by the action of the extractor means.

In a preferred form of the apparatus a discharge device for slag forming material is provided to form a curtain of that material which will fall adjacent the metal flow to be shattered therewith by the gas streams from the gas discharge means.

Figure 1:
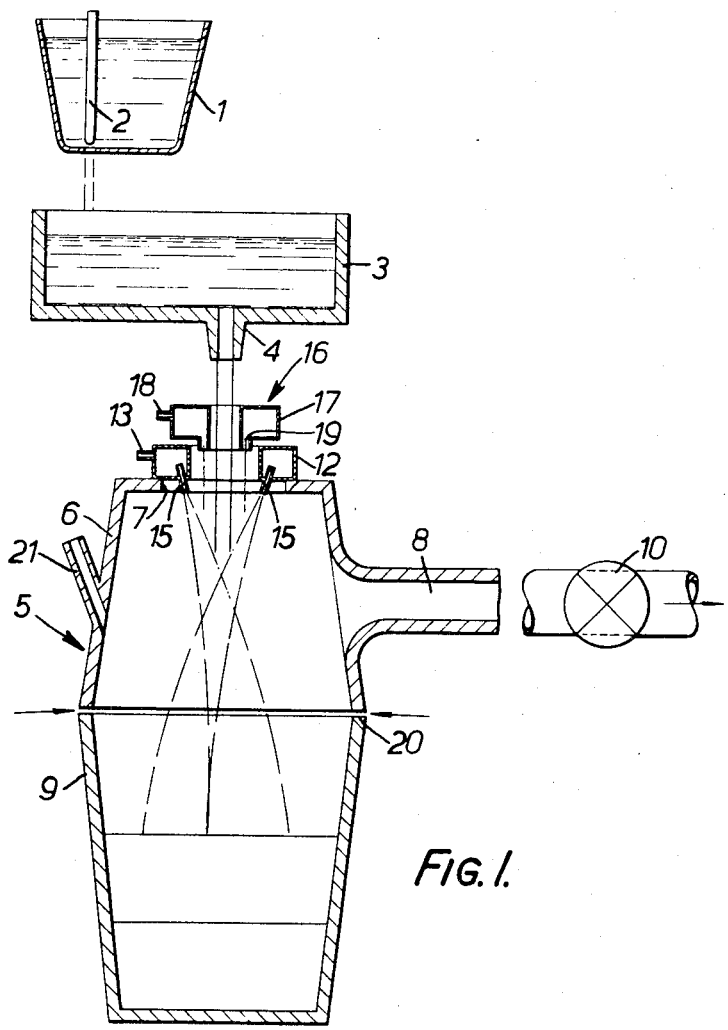
Figure 2:
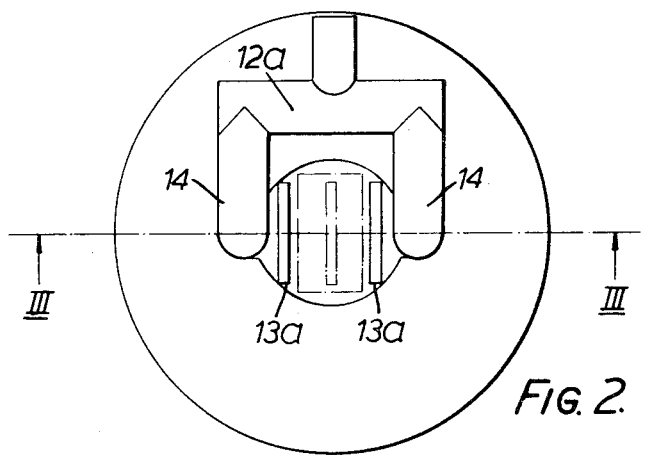
Figure 3:
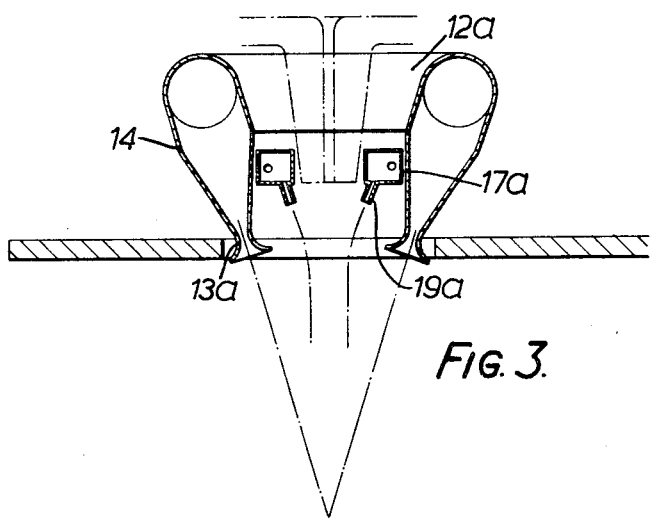
Figure 4:
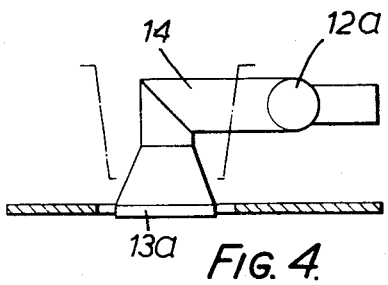

In order that the present invention may be well understood there will now be described some embodiments thereof, given by way of example only, reference being made to the accompanying drawing, in which:

FIG. 1 is a diagrammatic cross-section of refining apparatus;
FIG. 2 is a plan view of a gas discharge device;
FIG. 3 is a section on the line III—III of FIG. 2; and
FIG. 4 is an elevation of the gas discharge device.

The apparatus for refining metal shown in the drawing is particularly intended for refining crude iron and comprises a transfer ladle 1 having a flow control stopper 2 to control molten metal flow to a tundish 3 having a refractory outlet nozzle 4.

Beneath the tundish is a reaction vessel 5 which comprises a cover or hood portion 6, having a central aperture 7 and a gas take-off 8, and a receptacle portion 9 beneath the hood. An extractor fan 10 is located in the gas take-off, which may have a plurality of inlets symmetrically placed about the hood portion, only one being shown.

Located on the hood portion 6 is a gas discharge device comprising a header 12 having a gas inlet 13, and gas outlets 15, the outlets being angled to produce jets which converge downwardly and intersect one another, and the path of a stream discharged by the tundish nozzle 4, inside the hood portion.

The tundish nozzle may be circular in section normal to the nozzle axis and the gas discharge outlet may be an annular manifold having inwardly and downwardly directed outlets. Such a construction is shown and described in our Pat. No. 949,610.

Alternatively the tundish nozzle has a cross-section normal to the direction of flow of which the dimension of each of two opposite sides is several times greater than the mean dimension between those sides. For example, the stream may have larger sides of three inches and a mean distance between those sides of half an inch. Thus, a stream will be formed which has a very high surface area-to-volume ratio per unit length of the stream.

For shattering such a stream the gas discharge device comprises a header 12a (FIGS. 2 to 4) having takeoff chambers 14 each having an outlet 13a which spans the major side of the metal stream which will be poured and each has a convergent/divergent form in the direction of flow to accelerate the gas during discharge. The outlets may have at the exit a smaller dimension of 0.1 inch.

A flux discharge device 16 is mounted above the gas discharge device and in the case of FIG. 1 comprises an annular manifold 17 having an inlet 18 and outlets 19 to discharge a curtain surrounding the metal stream. The inlet 18 is coupled to a source of gas entrained flux. In the case of FIGS. 2 to 4 the flux discharge device comprises two manifolds 17a each having an outlet 19a which will form a curtain along the adjacent face of the metal stream.

To carry out refining, molten crude iron is withdrawn from a suitable source into the transfer ladle 1 and poured at a controlled rate into the tundish to maintain a constant head in the tundish. The metal in the tundish will fall from the outlet nozzle 4 as a wide thin coherent freely falling stream and the rate of flow with a nozzle passage of half an inch by three inches with a head of fourteen inches will be 1 ton per minute. The passage may be as large as half an inch by twenty-four inches to give a flow for the same head of 8 tons per minute.

The freely falling stream together with curtain streams of gas-entrained flux on each side discharged from the outlets 19 will be shattered and the streams of metal and gas-entrained flux will be intimately mixed by the oxygen discharged from the gas outlets 15. The small particles of molten iron present a large surface area to the action of the oxygen and the flux is rapidly melted by the heat generated and surrounds these droplets.

By adoption of the wide thin form of the metal stream the oxygen requirement for high rates of flow is of the same order per ton of metal treated as for small flow rates, additional oxygen merely for effecting adequate shattering of the stream being unnecessary.

Carbon, silicon, manganese, phosphorus and other impurities in the crude iron react with the oxygen to form carbon monoxide, silica, manganese oxide, phosphorus pentoxide and the like. Sulphur is removed as sulphur dioxide and sulphide in the slag which to retain such oxides as silica, manganese oxide, phosphorus pentoxide and the sulphide should be basic. To retain phosphorous pentoxide the slag should be oxidising and the flux therefore may be powdered lime or limestone admixed with iron oxide.

During the run of metal into the vessel, the extractor fan 10 operates to withdraw gas and fume from the vessel and is operated at a rate to cause air to be drawn into the vessel through a passage 20 defined by the hood portion and receptacle portion. This indrawn air will provide oxygen for the combustion of carbon monoxide and thereby the quantity of oxygen fed to the vessel through the gas discharge outlets is less than that which is required to fully oxidise the impurities to bring the metal impurities down to the desired limits.

Large quantities of heat are generated by the reaction and may be used to melt scrap. This scrap can be placed in the reaction vessel before a run is started. Alternatively or additionally scrap and/or pre-reduced or partially reduced iron ore may be fed into the reaction vessel by chute 21 during a run either continuously or intermittently. The addition of such material during a run is particularly advantageous as a teperature control arrangement and pre-reduced ore is particularly suitable since not only is it in suitable form for metering into the vessel, but it is of known composition so that the refined metal can be made to a precisely predetermined specification.

A small surplus of air over that required to burn the carbon monoxide is provided to ensure that no carbon monoxide enters the extractor inlet where it would present a potential danger of explosion in the extraction system.

By burning the carbon monoxide present in the vessel, the quantity of scrap which can be included is substantially increased.

Refining melt comprising 4.1% C, 2.3% Si, 1.0% Mn, 0.05% P, 0.05% S remainder iron at a rate of 24 tons per hour to a steel of 0.1% C, 0.01% Si, 0.02% Mn, 0.02% P, 0.02% S, the rest iron, the quantity of steel scrap melted to provide an end temperature of 1650° C. was between 990 and 1,080 lbs. for each 2,000 lbs. of molten iron. The theoretical maximum of scrap was 1,120 lbs. for each 2,000 lbs. of molten pig iron. In carrying out this refining the quantity of oxygen fed to the gas discharge nozzles was 2,500 cu. ft. per ton of metal and all the carbon monoxide was burnt to leave 1–2% oxygen at the extractor inlet, the quantity of indrawn air being 7,100 cu. ft./ton of metal.

The refining process may be a single-stage process or it may be effected in more than one stage. Thus a first stage spray refining may be effected to desiliconise and partly decarburise the iron. This pretreated iron may be further spray refined to remove further impurities in a second stage or may be fed as raw material for steel production in another vessel, e.g., an L.D. converter. In the case of further refining in an L.D. converter, the lower portion of the spray refining vessel of the first stage may be the L.D. converter vessel itself located below the hood portion, into which a lance can be lowered to effect the second stage.

As a further feature of a single stage process, the receiving vessel, after a run, may be agitated as by rotation to bring the reaction further toward equilibrium.

Instead of a rectangular outlet to form the metal stream a nozzle defining a passage of other cross section may be used to give a high surface-to-volume ratio per unit length of flow, such for example as an elliptical cross section.

What we claim is:
1. A process for refining molten carbon-containing metal comprising the steps of feeding the metal as a freely-falling flow from a container to a reaction vessel having an upper cover portion through which the molten metal may pass and a lower receiving portion, shattering the freely-falling flow in space within the vessel by convergent streams of primary oxidising gas which issue from gas discharge means spaced around the freely-falling metal flow to produce a spray of metal particles and to reduce the carbon content of the metal particles by oxidation to carbon monoxide, introducing secondary oxidising gas in the form of ambient air into the vessel at locations remote from the gas discharge means and spaced around the said spray to combust the carbon monoxide within the vessel, utilising the heat developed by the oxidation and combustion to melt a solid charge fed to the vessel, and collecting the refined molten particulate metal in the lower receiving portion of the vessel.

2. A process according to claim 1 in which the solid charge is fed to the vessel continuously.

3. A process according to claim 1 in which slag-producing material is fed to the reaction vessel as a freely-falling flow adjacent the metal flow, the flows of slag-producing material and metal being intimately mixed by the convergent streams of primary oxidising gas as they shatter the metal flow.

4. A process according to claim 1 in which the secondary oxidising gas is introduced to the reaction vessel through an annular space formed between the cover and receiving portions of the vessel.

References Cited
UNITED STATES PATENTS

| | | | |
|---|---|---|---|
| 3,272,618 | 9/1966 | Miller | 75—60 |
| 3,201,105 | 8/1965 | Miller | 75—60 X |
| 2,969,282 | 1/1961 | Churcher | 75—60 |
| 2,915,380 | 12/1959 | Hicty | 75—52 |

FOREIGN PATENTS

| | | | |
|---|---|---|---|
| 890,282 | 2/1962 | Great Britain | 75—60 |
| 949,610 | 2/1964 | Great Britain | 75—60 |
| 1,006,082 | 9/1965 | Great Britain | 75—60 |

L. DEWAYNE RUTLEDGE, Primary Examiner

G. K. WHITE, Assistant Examiner

U.S. Cl. X.R.

75—60